(12) United States Patent
Neisen

(10) Patent No.: US 11,858,561 B2
(45) Date of Patent: Jan. 2, 2024

(54) MATERIAL TRANSFER VEHICLE WITH MOVABLE OPERATOR'S PLATFORM

(71) Applicant: Roadtec, Inc., Chattanooga, TN (US)

(72) Inventor: Matthew Neisen, Soddy Daisy, TN (US)

(73) Assignee: Roadtec, Inc., Chattanooga, TN (US)

( * ) Notice: Subject to any disclaimer, the term of this patent is extended or adjusted under 35 U.S.C. 154(b) by 367 days.

(21) Appl. No.: 17/076,349

(22) Filed: Oct. 21, 2020

(65) Prior Publication Data

US 2021/0122432 A1    Apr. 29, 2021

Related U.S. Application Data

(60) Provisional application No. 62/924,844, filed on Oct. 23, 2019.

(51) Int. Cl.
*B62D 33/063*     (2006.01)
*E01C 19/00*      (2006.01)
*E01C 19/48*      (2006.01)

(52) U.S. Cl.
CPC ........ *B62D 33/0636* (2013.01); *E01C 19/002* (2013.01); *E01C 19/4853* (2013.01); *E01C 2301/30* (2013.01)

(58) Field of Classification Search
CPC .... E01C 19/002; E01C 19/48; E01C 19/4853; E01C 2301/00; E01C 2301/04; E01C 2301/30; E02F 9/166; B62D 33/0636; B62D 33/063
See application file for complete search history.

(56) References Cited

U.S. PATENT DOCUMENTS

| 5,073,063 | A | * | 12/1991 | Brown | .............. E01C 19/463 404/101 |
| 8,590,983 | B2 | | 11/2013 | Berning et al. | |
| 9,956,917 | B1 | | 5/2018 | Neisen | |
| 2002/0182009 | A1 | * | 12/2002 | Barnat | .............. E01C 19/48 404/101 |

(Continued)

FOREIGN PATENT DOCUMENTS

CN      110939044 B  *  3/2023  .............. B60N 2/04
EP      0306152 A1      3/1989

OTHER PUBLICATIONS

International Search Report of counterpart PCT Application No. PCT/US2020/056651, dated Jan. 22, 2021.

(Continued)

*Primary Examiner* — Jason D Shanske
*Assistant Examiner* — Scott F. Underwood
(74) *Attorney, Agent, or Firm* — Chambliss, Bahner & Stophel, P.C.; Stephen D. Adams

(57) ABSTRACT

A material transfer vehicle has a frame, a front end including an asphalt paving material receiving device, and rear end including a discharge conveyor which is adapted to convey asphalt paving material to the receiving hopper of an asphalt paving machine. An operator's station includes an operator's platform on which is mounted an operator's seat. The operator's platform is moveable between a travel position that is entirely within the outer periphery of the material transfer vehicle and an operating position that locates the operator's seat at least partially outside the outer periphery of the material transfer vehicle.

17 Claims, 10 Drawing Sheets

(56) References Cited

U.S. PATENT DOCUMENTS

| | | | |
|---|---|---|---|
| 2006/0034661 A1* | 2/2006 | Junga | B62D 33/0633 |
| | | | 404/128 |
| 2008/0292398 A1 | 11/2008 | Potts | |
| 2013/0241251 A1 | 9/2013 | Jones et al. | |
| 2013/0270888 A1 | 10/2013 | Herzberg | |
| 2014/0013879 A1 | 1/2014 | Enrile Medina et al. | |
| 2015/0166274 A1* | 6/2015 | Swearingen | E01C 19/48 |
| | | | 414/809 |
| 2016/0096554 A1 | 4/2016 | Klein et al. | |
| 2018/0201237 A1 | 7/2018 | Wells et al. | |
| 2020/0094887 A1* | 3/2020 | Johnson | B62D 33/0636 |
| 2022/0219573 A1* | 7/2022 | Buschmann | B60N 2/502 |

OTHER PUBLICATIONS

Extended European Search Report for EP application No. 20880305.6, dated Sep. 8, 2022, 7 pages.

* cited by examiner

MATERIAL TRANSFER VEHICLE WITH MOVABLE OPERATOR'S PLATFORM

CROSS-REFERENCE TO RELATED APPLICATION

This application claims the benefit of U.S. Provisional Patent Application No. 62/924,844, which was filed on Oct. 23, 2019.

FIELD OF THE INVENTION

This invention relates generally to material transfer vehicles, and more particularly, to a material transfer vehicle having an operator's station that includes an operator's platform which is moveable between a travel position and an operating position.

BACKGROUND OF THE INVENTION

Asphalt paving material is comprised of an asphaltic binder and aggregates of various particle sizes, including both coarse and fine aggregate materials. Because the equipment needed to produce asphalt paving material is expensive and the space required extensive, asphalt paving material is typically produced in a production facility that is dedicated to such purpose. Consequently, it is frequently necessary to transport the asphalt paving material from its place of origin to an asphalt paving machine at a remote paving site. The asphalt paving material is usually transported in dump trucks to an asphalt paving machine or to a material transfer vehicle that completes the transfer to the asphalt paving machine.

An asphalt paving machine is a self-propelled vehicle that is driven by a wheeled or tracked drive system. In a common type of paving machine, an asphalt receiving hopper is located at the front end of the machine to receive asphalt paving material, and a slat-type hopper conveyor located below the asphalt receiving hopper transfers the asphalt paving material from the hopper to a distribution assembly comprising a transverse distributing auger that is mounted at the rear of the machine. The asphalt paving material is deposited onto and across the roadway or other surface to be paved by the distributing auger, and a floating screed located behind the distributing auger compacts the asphalt paving material to form an asphalt mat.

Sometimes, asphalt paving material is discharged directly from a delivery truck into the asphalt receiving hopper of the asphalt paving machine. A dump-type delivery truck is unloaded by raising the truck bed and allowing the asphalt paving material to slide down the bed into the receiving hopper. When the truck bed is raised, it should not come into contact with the receiving hopper and should not be carried by or ride on any portion of the paving machine. For smaller-capacity dump trucks, contact with the paver is not often a problem. However, such contact can be a problem when large tractor-semitrailer units are used as delivery vehicles, particularly when the truck bed is extended to its highest point. In addition, if a delivery truck contacts the paver so that a portion of the weight of the delivery truck is carried by the paver as the paving operation is carried out, the screed elevation may be changed, which will affect the elevation and smoothness of the finished asphalt mat.

When asphalt paving material is delivered to the paving machine by delivery trucks, it is frequently necessary for a series of delivery trucks to move into contact with the front end of the paving machine to serially discharge their loads into the paving machine's asphalt receiving hopper. This method of delivery requires multiple truck maneuvers that are often difficult to achieve without stopping the paving machine. However, when a paving machine stops and subsequently restarts, its floating screed will produce a dip in the asphalt mat (when the machine stops) and a bump (when it restarts). In addition, because a typical delivery truck carries more asphalt paving material than can be unloaded quickly into the receiving hopper of the asphalt paving machine, it is frequently necessary for the paving machine to push the truck in the paving direction as the truck is unloaded while paving proceeds. This may be difficult to manage when the paving machine is proceeding through intersections or operating on curved sections of the roadway. Furthermore, the ability of the paving machine operator to place a smooth mat on the roadway will be affected by the rate of feed of asphalt paving material to the paving machine. This requires planning for proper scheduling of delivery trucks and coordination with the asphalt production facility. However delays at the production facility or traffic encountered by the delivery trucks can thwart the efforts of the most careful planners. Consequently, because it is desirable to keep the paving machine moving at all times during an asphalt paving operation, and since delivery trucks must be unloaded as they are pushed along in the paving direction, it is frequently necessary to have delivery trucks queue up near the paving machine to ensure that a loaded truck is available to move quickly into unloading position as an unloaded truck is moved out of the way. This may result in heat losses in the asphalt paving material in the waiting trucks, which can affect the quality of the asphalt mat being created by the paving machine.

A delivery truck can also be used to deliver the asphalt paving material to a windrow on the roadway in front of the paver. If the delivery truck is a dump truck, the windrow is usually formed by a spreader box or a windrow blending unit. If a spreader box is used, it will be pulled behind the truck, and the truck bed will be raised to deposit the asphalt paving material into the box. As the truck moves forward, the asphalt paving material is uniformly metered out of the box onto the roadway. If a windrow blending unit is used, it will typically be attached to a small front-end loader, and the asphalt paving material dumped onto the existing roadway across the width of the truck bed. The windrow blending unit will fold the asphalt paving material into a windrow as the blending unit is pushed forward by the loader. A bottom-unloading truck may also be used to deposit asphalt paving material in the form of a windrow onto the roadway.

When asphalt paving material is deposited on the roadway in the form of a windrow, it may be picked up from the roadway surface by a windrow elevator that is attached to the front of the asphalt paving machine. However, because it is desirable to keep the paving machine moving at all times while the paving machine is being operated, the windrow method of delivery may still require delivery trucks queueing up near the paving machine to insure that a windrow of asphalt paving material is available as soon as it is needed by the paving machine. This may also result in heat losses in the asphalt paving material in the waiting windrows, which can affect the quality of the asphalt mat being created by the paving machine.

For all of the difficulties associated with the timely delivery of asphalt paving material by individual delivery trucks into the asphalt receiving hopper of a paving machine or in the form of windrows, material transfer vehicles have been used in recent years to transport asphalt paving material to an asphalt paving machine. A material transfer vehicle may be used to shuttle asphalt paving material between the delivery trucks or windrows and the asphalt paving machine. One type of material transfer vehicle has a truck-receiving hopper into which a delivery truck may dump its entire load. Another type of material transfer vehicle is equipped with a windrow pick-up head that can pick up a windrow of asphalt paving material that has been dumped on the roadway as the material transfer vehicle is moved into the windrow. These vehicles are adapted to move alongside an asphalt paving machine and transfer the asphalt paving material received from the trucks or the windrows into the receiving hopper of the asphalt paving machine. Still another type of material transfer vehicle is adapted to move alongside the asphalt paving machine while being tethered to a delivery truck to allow for the transfer of asphalt paving material from a delivery truck to an asphalt paving machine without requiring either the delivery truck or the material transfer vehicle to make direct contact with the asphalt paving machine, thus reducing the time required for delivery truck maneuvers and reducing the risk that the paving machine will have to stop during the paving operation.

Self-propelled material transfer vehicles may include an asphalt paving material receiving device comprising a large-capacity truck-receiving hopper or a window pick-up head, and an inclined loading conveyor extending upwardly from the hopper or pick-up head. A transversely oriented auger in the truck-receiving hopper or windrow pick-up head may be provided to urge asphalt paving material onto the loading conveyor. The asphalt paving material is carried upwardly by the loading conveyor from the truck-receiving hopper or pick-up head and discharged off the elevated output end of the loading conveyor into a chute mounted on the lower end of a discharge conveyor, or into an intermediate surge bin that is sized to hold the entire load of a delivery truck. The discharge of asphalt paving material off the elevated output end of the loading conveyor so that it may fall under the influence of gravity into a chute or surge bin assists in preventing undesirable segregation of the various particulate components of the asphalt paving material by particle size.

Material transfer vehicles of the type that are equipped with a surge bin typically include an auger in the surge bin that re-blends the asphalt paving material to eliminate particle size segregation that occurs as the material is transported. It also helps to keep the heat in the asphalt paving material evenly distributed throughout the entire load of material obtained from the delivery truck or windrow. In addition, these material transfer vehicles include a conveyor in the surge bin that is adapted to transfer the asphalt paving material to the discharge conveyor.

Discharge conveyors that are mounted on self-propelled material transfer vehicles with and without surge bins are generally pivotable about a substantially vertical axis so that the transfer vehicle can be positioned adjacent to an asphalt paving machine that is laying an asphalt mat and rapidly discharge asphalt paving material into the hopper of the paving machine as the material transfer vehicle moves with the paving machine along the roadway. Furthermore, these discharge conveyors are configured so that their discharge end may be raised and lowered to position the discharge outlet advantageously with respect to the asphalt receiving hopper of a paving machine. The moveable nature of these discharge conveyors allows for some flexibility in locating the material transfer vehicle adjacent to the asphalt paving machine. Because of its rapid loading and unloading capabilities, a self-propelled material transfer vehicle equipped with a surge bin can rapidly shuttle between delivery trucks or windrows at a pick-up point and an asphalt paving machine that is laying an asphalt mat at a paving site so that there is less likelihood that the paving machine will have to stop paving because of a lack of asphalt paving material.

When a self-propelled material transfer vehicle is used in an asphalt paving process, a delivery truck can be stopped a significant distance away from the paving machine in order to unload its load from a stopped position into the material transfer vehicle or onto the roadway in the form of a windrow. Thus, the delivery truck can unload faster when not unloading directly into the paving machine, and the unloading location may be selected so that there is no danger of the raised dump bed of the truck hitting power lines or tree limbs on the side of the roadway. The use of a material transfer vehicle also reduces the need for delivery trucks to queue up at the paving machine in order to keep it moving, thereby cutting the waiting time of the delivery trucks and thereby reducing truck operating costs.

Even though material transfer vehicles are typically self-propelled, it is often necessary to transfer a material transfer vehicle to a paving site on a flat-bed trailer. Consequently, the operator's seat of a conventional material transfer vehicle is located inside the outer periphery of the vehicle, in order to meet highway shipping width requirements. Even though the operator's seat may be mounted on a pedestal in the operator's station that can be rotated about a substantially vertical axis, the operator's view is still partially obstructed by components of the material transfer vehicle within the outer periphery. It would be advantageous if an operator's station could be provided with a moveable platform containing an operator's seat, which platform can be moved between a travel position entirely inside the outer periphery of the material transfer vehicle and an operating position that is at least partially outside the outer periphery of the material transfer vehicle in order to provide the operator with an unobstructed view of the entire field of operation of the material transfer vehicle.

Advantages of the Invention

Among the advantages of the invention is that it provides a material transfer vehicle that has an operator's platform containing an operator's seat that is moveable between a travel position that is entirely inside the outer periphery of the material transfer vehicle and an operating position that is at least partially outside the outer periphery of the material transfer vehicle so as to provide a better view of the field of operation of the material transfer vehicle for the operator. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The term "substantially" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The terms "operatively attached" and "operatively connected" describe such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "asphalt paving material" refers to a bituminous paving mixture that is comprised of asphalt cement and crushed stone, recycled asphalt shingles, recycled asphalt pavement materials and/or other aggregate materials of varying particle size, and which is used for paving purposes.

The terms "asphalt paving machine", "paving machine" and "paver" refer to a finishing machine for applying asphalt paving material to form an asphalt mat on a roadway, parking lot or similar surface. An asphalt paving machine or paver is typically a self-propelled vehicle having an asphalt receiving hopper on its front end, a distributing auger for distributing asphalt paving material across a roadway, a conveyor for moving the asphalt paving material from the receiving hopper to the distributing auger, and a floating screed located behind the distributing auger for forming an asphalt mat on the roadway.

The term "asphalt mat" refers to a layer of asphalt paving material such as is applied by an asphalt paving machine to produce a roadway, parking lot or similar surface.

The term "material transfer vehicle" refers to a self-propelled vehicle that is adapted to receive asphalt paving material from a delivery truck or a windrow and to transfer the asphalt paving material to the asphalt receiving hopper of an asphalt paving machine.

The term "outer periphery", when used with respect to the location of an operator's seat in a material transfer vehicle, is defined by the outer extent of the operator's station of the material transfer vehicle. The outer periphery defines a width of the material transfer vehicle, as measured transverse to the longitudinal centerline of the vehicle.

The terms "linear actuator" and "actuator" refer to an electric, hydraulic, electro-hydraulic, pneumatic or mechanical device that generates force which is directed in a straight line.

SUMMARY OF THE INVENTION

The invention comprises a material transfer vehicle having a frame, a front end, and a rear end. The material transfer vehicle has an asphalt paving material receiving device at the front end and a discharge conveyor at the rear end. The discharge conveyor is adapted to convey asphalt paving material to the receiving hopper of an asphalt paving machine. An operator's station comprises an operator's platform on which is mounted an operator's seat. The operator's platform is moveable between a travel position that is entirely within the outer periphery of the material transfer vehicle and an operating position that locates the operator's seat at least partially outside the outer periphery of the material transfer vehicle. In a preferred embodiment of the invention, the operator's platform is moveable between a travel position that is entirely within the outer periphery of the material transfer vehicle and an operating position that locates the operator's seat substantially outside the outer periphery of the material transfer vehicle.

In order to facilitate an understanding of the invention, the preferred embodiment of the invention, as well as the best mode known by the inventor for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventor includes all equivalents of the subject matter described and claimed herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENT OF THE INVENTION

Figure 1:
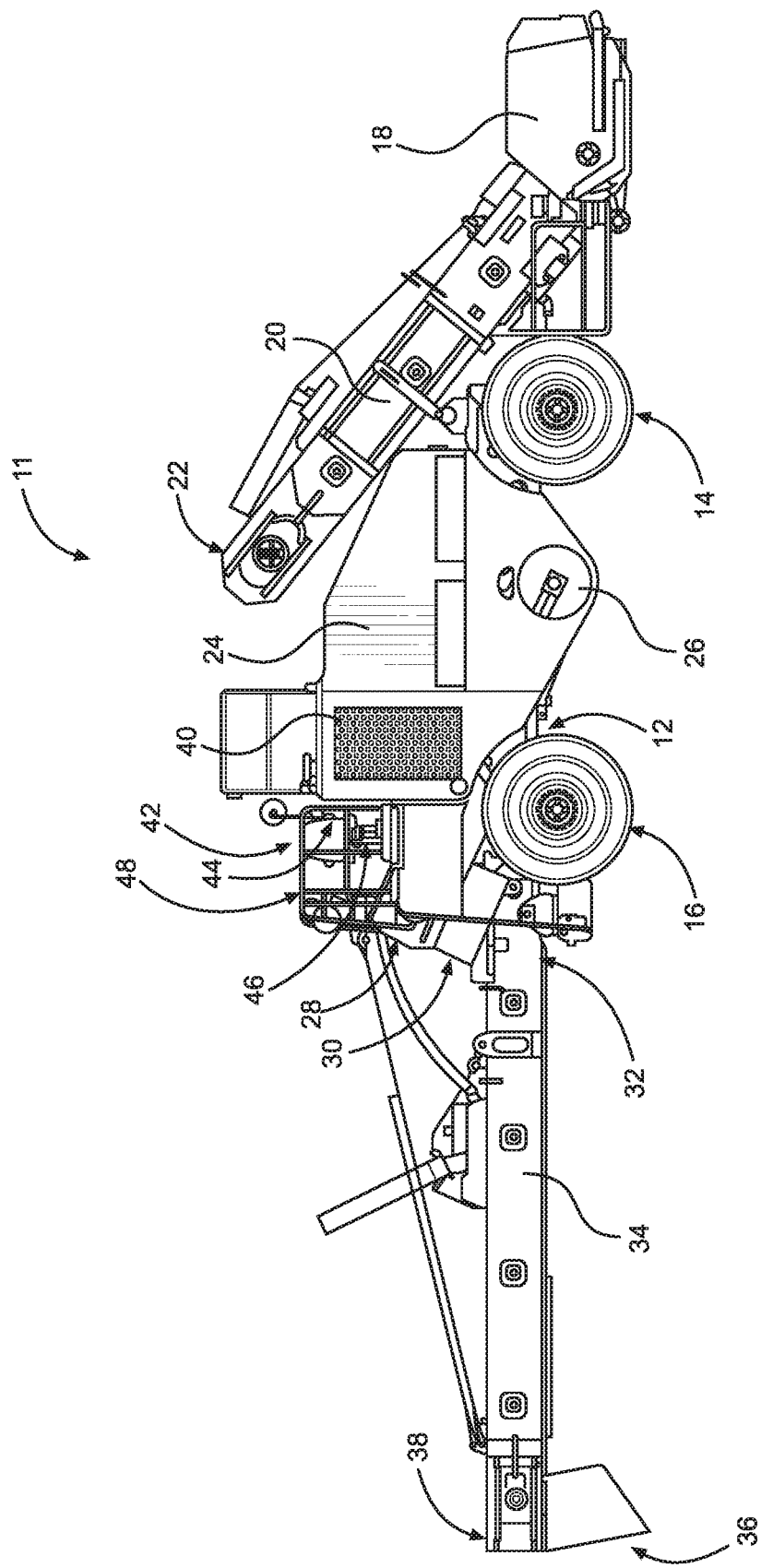
FIG. 1 is a side view of a first embodiment of a conventional material transfer vehicle of a type that may be constructed according to the invention.

This description of a preferred embodiment of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIG. 1, a conventional self-propelled material transfer vehicle 11 includes a frame 12 that is supported on the roadway surface by front and rear ground-engaging drive assemblies including right front drive wheel 14 and right rear drive wheel 16. Material transfer vehicle 11 also includes a left front drive wheel (not shown but substantially similar to right front drive wheel 14) and a left rear drive wheel (not shown but substantially similar to right rear drive wheel 16). Each of the drive wheels is driven by a hydraulic motor (not shown) that is supplied with fluid under pressure by one or more hydraulic pumps (also not shown). In the alternative, the frame of the vehicle may be supported on the roadway surface by ground-engaging drive assemblies comprising one or more left side track-drive assemblies (not shown), and one or more right side track-drive assemblies (also not shown), as is known to those having ordinary skill in the art to which the invention relates.

Vehicle 11 includes an asphalt paving material receiving device comprising a truck-receiving hopper 18. Truck-receiving hopper 18 is adapted to receive asphalt paving material from a delivery truck (not shown). In the alternative, vehicle 11 could be equipped with an asphalt paving material receiving device comprising a windrow pick-up head (not shown). An auger (not shown) is mounted in truck-receiving hopper 18 and is adapted to assist in conveying asphalt paving material from truck-receiving hopper 18 into loading conveyor 20, which in turn conveys the asphalt paving material off of its output end 22 and into surge bin 24. The surge bin includes transverse auger 26 that is employed to mix the asphalt paving material in the surge bin in order to minimize segregation or separation of the aggregate portion of the asphalt paving material by size. Also located in the surge bin is surge conveyor 28, which is adapted to convey asphalt paving material upwardly out of the surge bin so that it may fall through chute 30 which is located over input end 32 of discharge conveyor 34. Asphalt paving material conveyed out of the surge bin by surge conveyor 28 falls through chute 30 and onto input end 32 of discharge conveyor 34. Discharge conveyor 34 is mounted for vertical pivotal movement about a substantially horizontal pivot axis at its input end that is perpendicular to the page of FIG. 1, as raised and lowered by a linear actuator (not shown). Discharge conveyor 34 is also adapted for side-to-side movement about a substantially vertical axis by operation of one or more additional actuators (also not shown). Asphalt paving material that falls through chute 30 onto discharge conveyor 34 is discharged through chute 36 at conveyor output end 38 into an asphalt receiving hopper of an asphalt paving machine (not shown).

Hydraulic drive systems including hydraulic pumps and hydraulic motors are provided to drive the various augers and conveyors. An engine (not shown) is located within engine compartment 40 adjacent to operator's station 42 and provides the motive force for the hydraulic pumps that drive the hydraulic motors for the drive wheels, the augers and the various conveyors and other components of the vehicle. Operator's station 42 includes an operator's seat 44 that is mounted on pedestal 46 so that the operator may turn the seat between a position that allows the operator to face forwardly and a position that allows him to face rearwardly. In many such material transfer vehicles, two operator's stations are provided, one on the left side of the vehicle and another on the right side. This allows an operator to move to the side of the machine that provides the best view, depending on the side of the roadway on which the machine is operating. In some embodiments of this material transfer vehicle, operator's seat 44 is fixed in place within operator's station 42. In other embodiments, operator's seat 44 may slide transversely by a limited amount; however, any such transverse movement is constrained by rail assembly 48 so that the operator's seat cannot extend outside the outer periphery of the material transfer vehicle. Consequently, the operator's view from either side of the machine is partially obstructed, regardless of the position of operator's seat 44.

Figure 2:
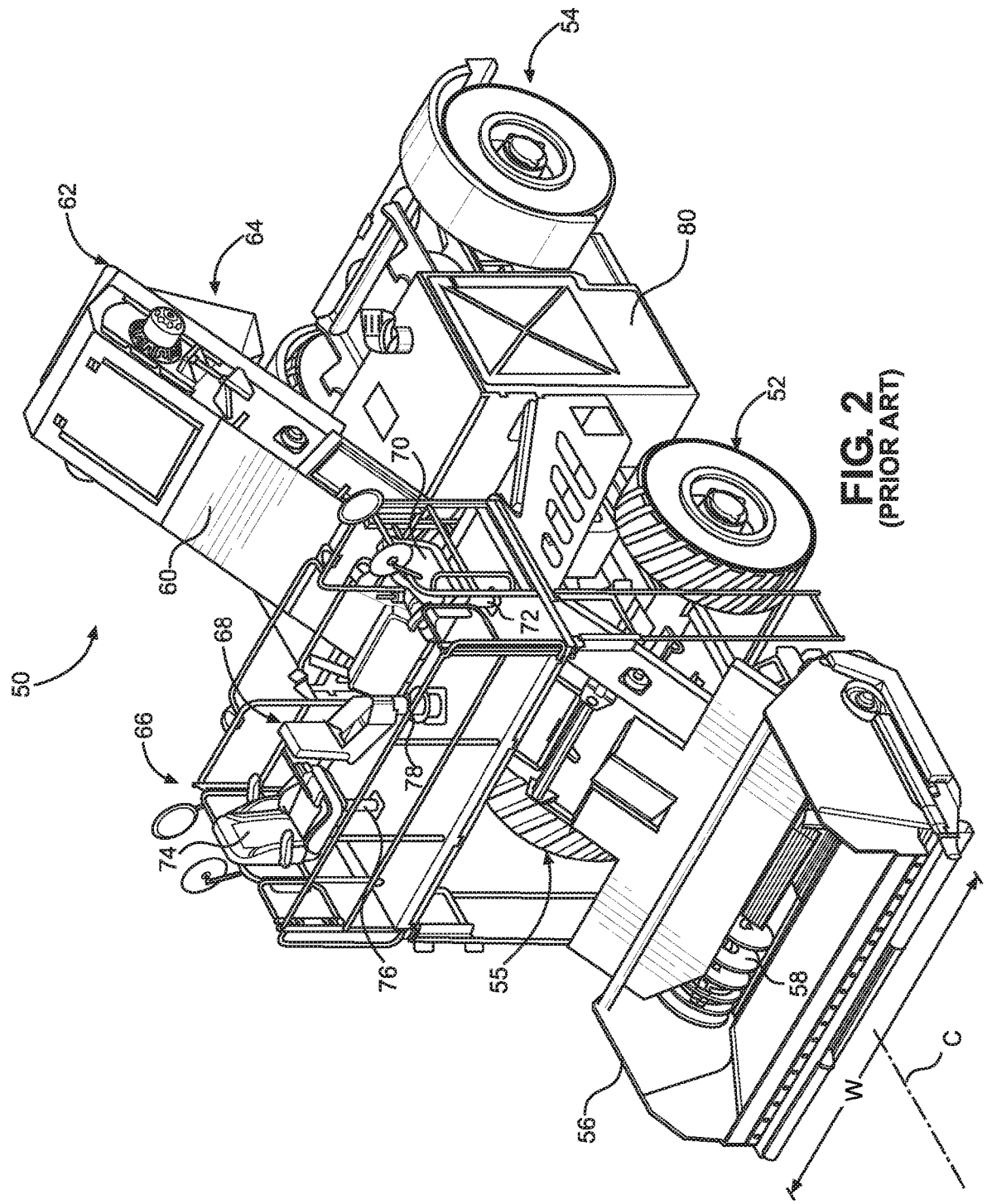
FIG. 2 is a perspective view of a second embodiment of a conventional material transfer vehicle of a type that may be constructed according to the invention.
Figure 3:
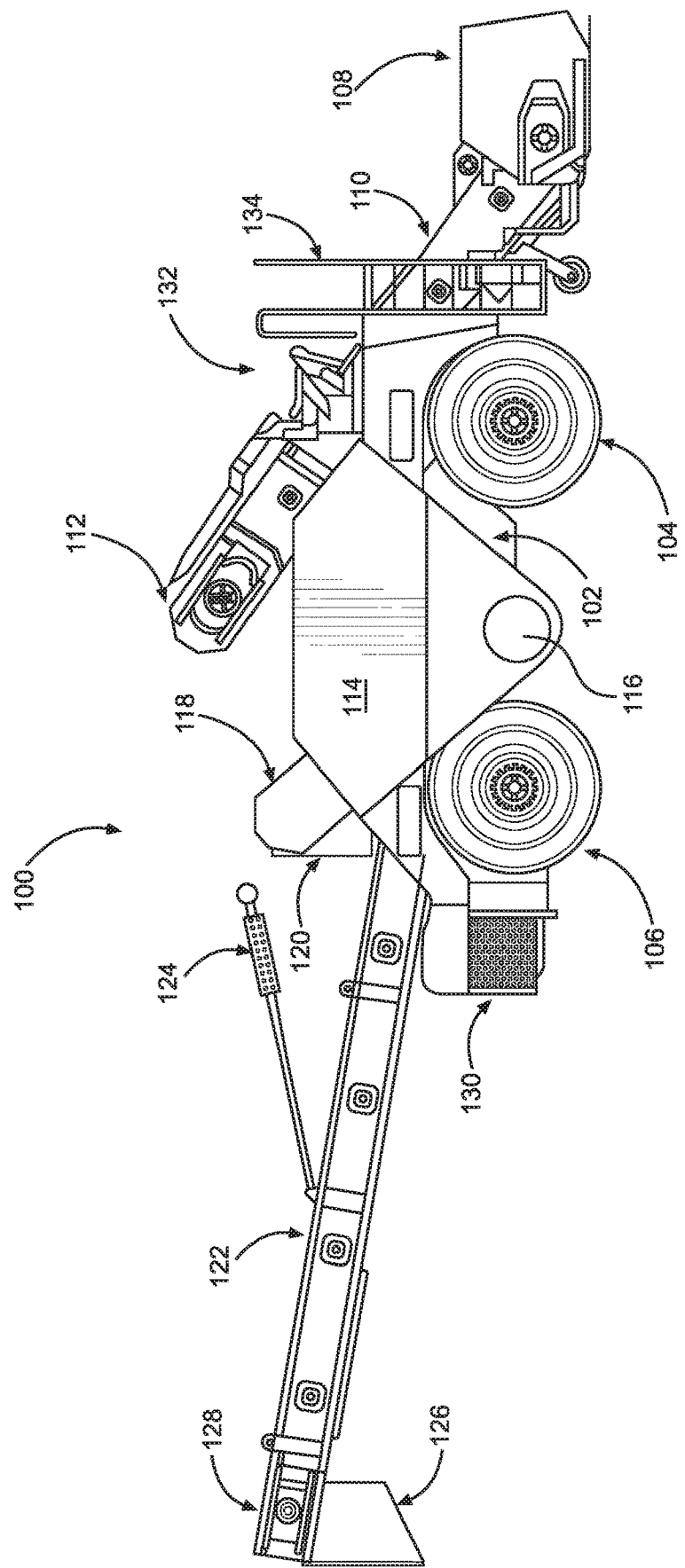
FIG. 3 is a side view of a material transfer vehicle similar to that shown in FIG. 1 that has been constructed according to the invention.
Figure 4:
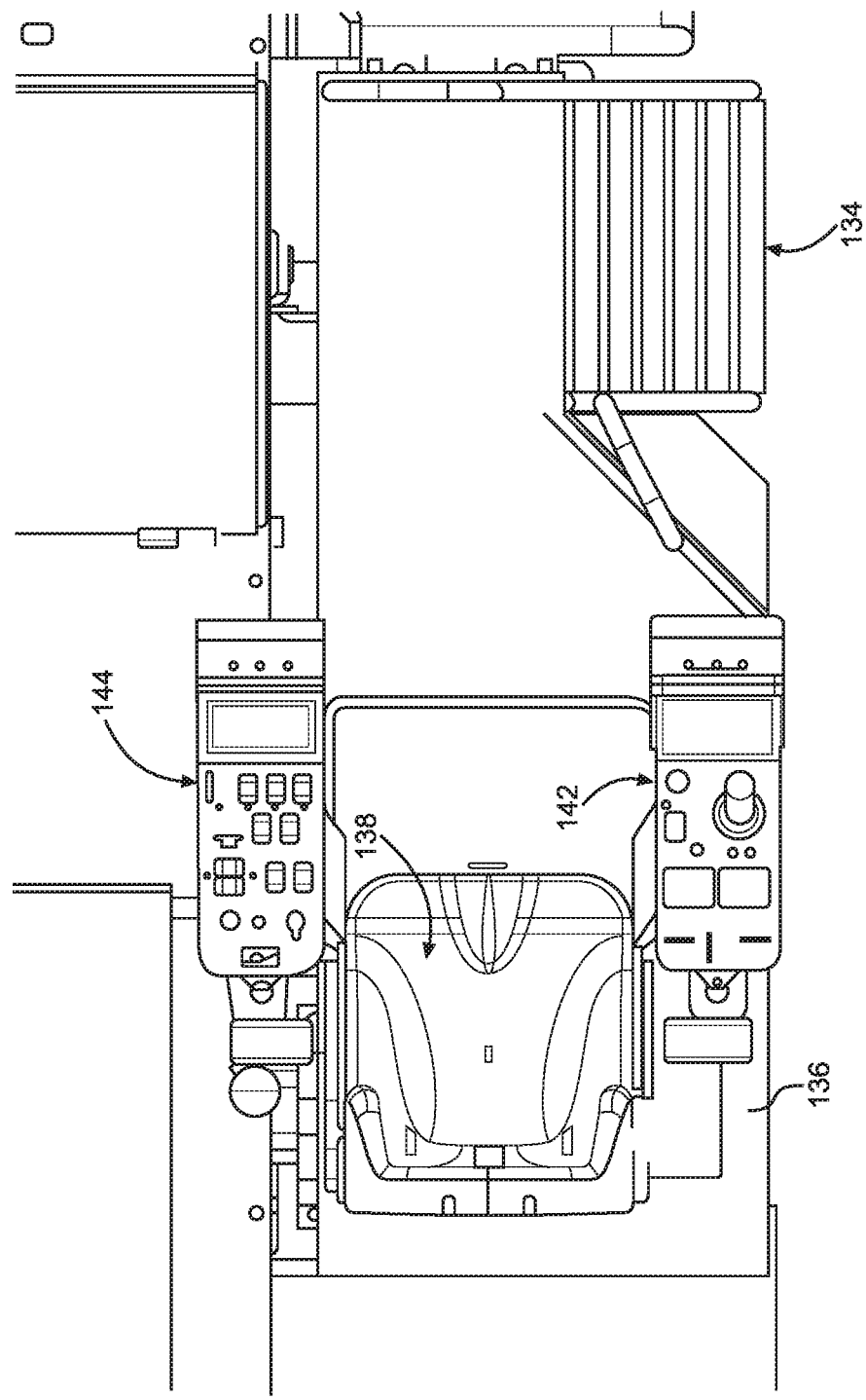
FIG. 4 is a top view of a portion of the material transfer vehicle shown in FIG. 3, illustrating the right operator's platform in a travel position.
Figure 5:
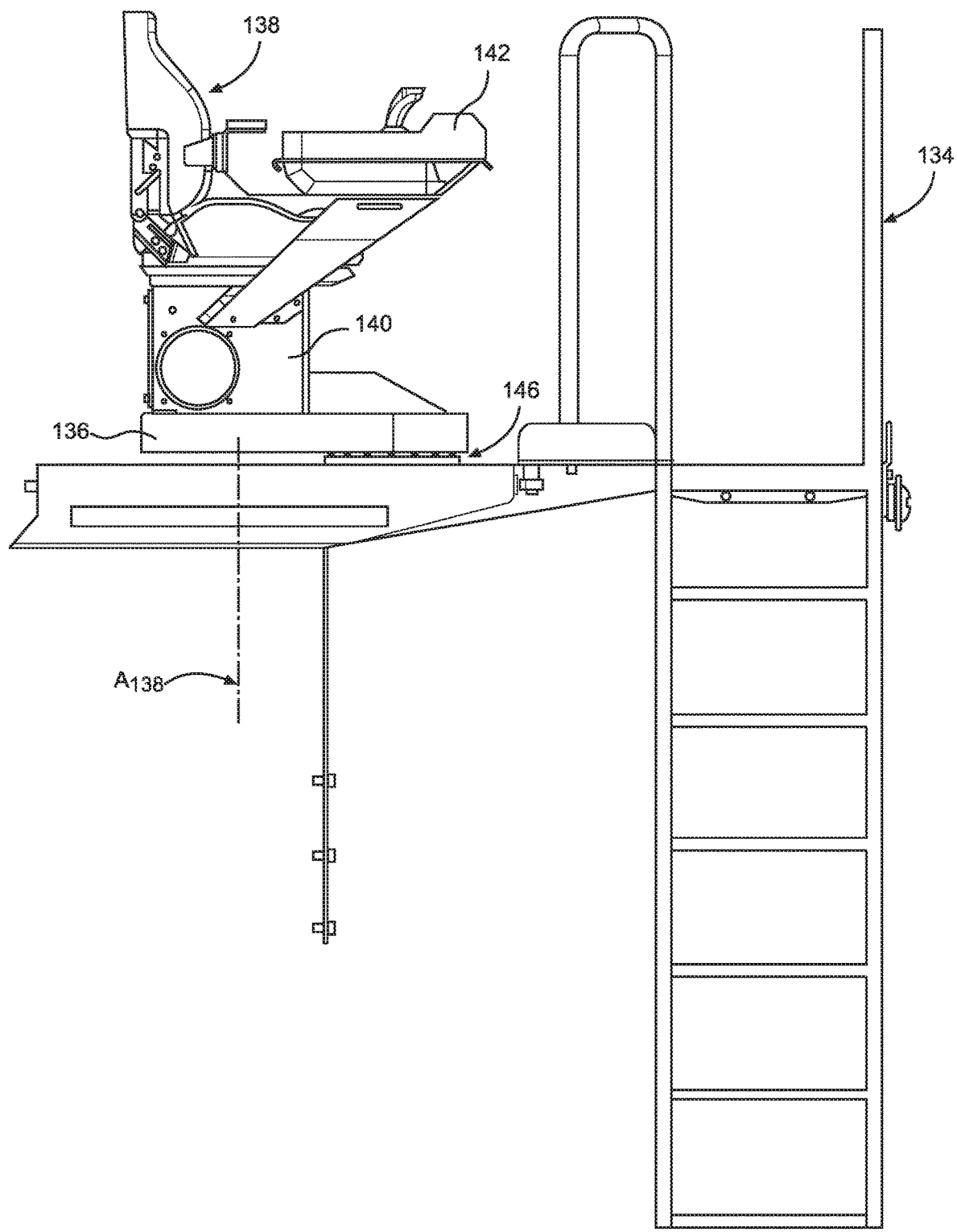
FIG. 5 is an enlarged side view of the right operator's platform in the travel position illustrated in FIG. 4.
Figure 6:
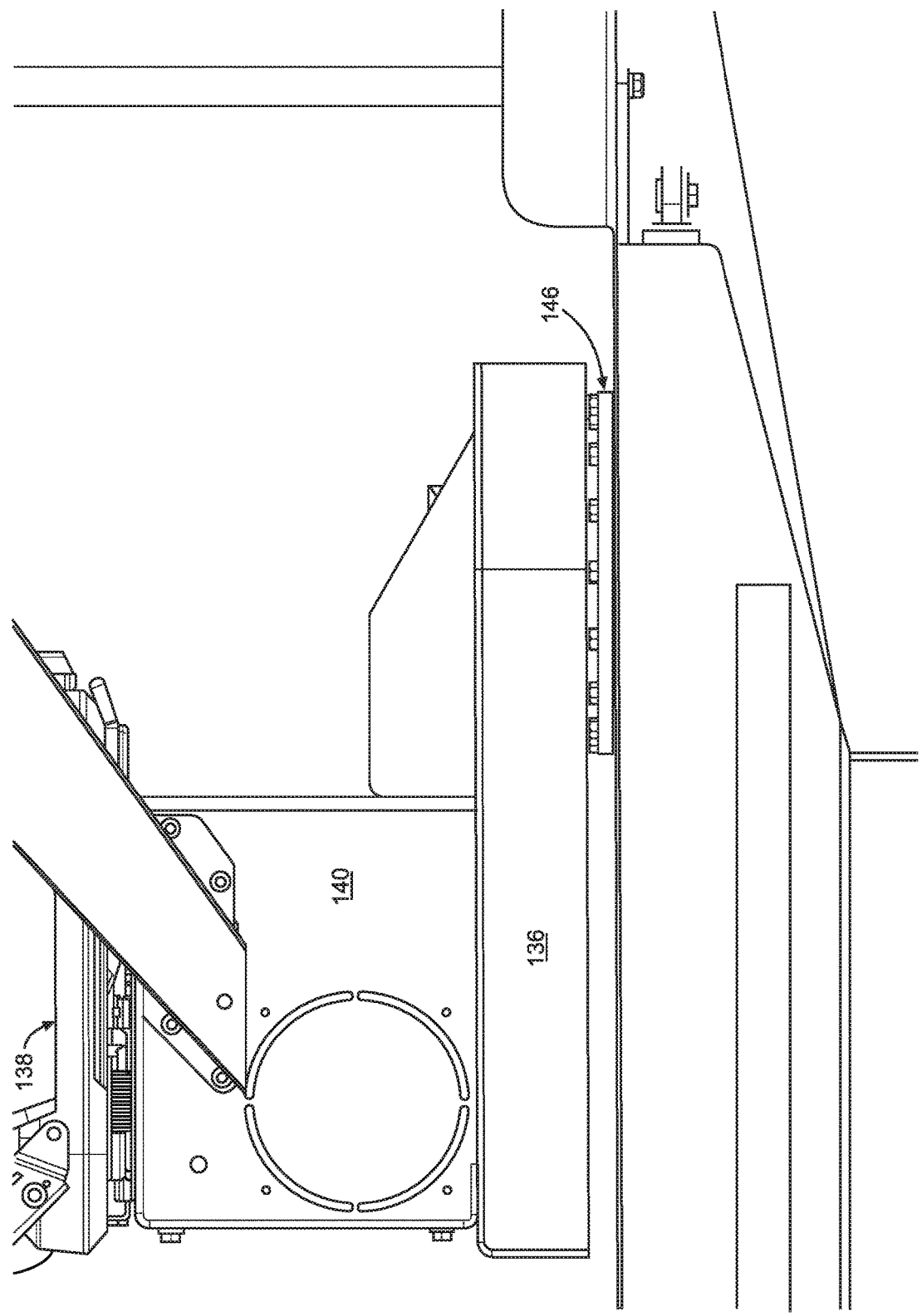
FIG. 6 is an enlarged view of a portion of the right operator's platform shown in FIG. 5, illustrating a portion of a preferred slewing bearing of the platform moving assembly that is employed to move the operator's platform between the travel position and the operating position.

FIG. 2 illustrates an alternative conventional material transfer vehicle 50 which includes a frame that is supported on the roadway surface by front and rear ground-engaging drive assemblies comprising left front drive wheel 52 and left rear drive wheel 54. Material transfer vehicle 50 also includes right front drive wheel 55 and a right rear drive wheel (not shown but substantially similar to left rear drive wheel 54). Each of the drive wheels is driven by a hydraulic motor (not shown) that is supplied with fluid under pressure by one or more hydraulic pumps (also not shown). In the alternative, the frame of the vehicle may be supported on the roadway surface by ground-engaging drive assemblies comprising one or more left side track-drive assemblies (not shown), and one or more right side track-drive assemblies (also not shown).

Vehicle 50 includes an asphalt paving material receiving device comprising a truck-receiving hopper 56. Truck-receiving hopper 56 is adapted to receive asphalt paving material from a delivery truck (not shown). In the alternative, vehicle 50 could be equipped with an asphalt paving material receiving device comprising a windrow pick-up head (not shown). Auger 58 in truck-receiving hopper 56 is adapted to urge asphalt paving material into loading conveyor 60. Loading conveyor 60 is operatively attached to the truck-receiving hopper and is adapted to convey asphalt paving material from truck-receiving hopper 56 upwardly to its output end 62, from which it will fall through chute 64 onto the lower input end of a discharge conveyor (not shown, but substantially similar to discharge conveyor 34). Material transfer vehicle 50 also includes operator's station 66 from which all operating functions of the vehicle may be controlled via control panel 68. Operator's station 66 includes left operator's seat 70, which is adapted to rotate on pedestal 72, and right operator's seat 74, which is adapted to rotate on pedestal 76.

Control panel 68 is mounted on pedestal 78 and is adapted to rotate between a left-facing position and a right-facing position. However, since operator's station 66 is fixed within the outer periphery of the material transfer vehicle, and since the pedestals 72 and 76 do not move laterally, the operator's view from either side of the vehicle is nevertheless partially obstructed.

Material transfer vehicle 50 includes various hydraulic pumps and hydraulic motors, which are provided to drive the various augers and conveyors. An engine (not shown, but located in engine compartment 80) provides the motive force for the hydraulic pumps that drive the hydraulic motors for the drive wheels, the augers and conveyors and other components of the vehicle. Material transfer vehicle 50 has a longitudinal centerline "C" and a width "W" of operator's station 66 that is measured transverse to the longitudinal centerline "C". Thus, width "W" defines the extent of the "outer periphery" of the vehicle. In other words, the outer periphery on one side of the vehicle is measured to be (0.5)W from the centerline.

FIGS. 3-10 illustrate a preferred embodiment of the invention. As shown therein, material transfer vehicle 100 includes a frame 102 that is supported on the roadway surface by front and rear ground-engaging drive assemblies comprising right front drive wheel 104 and right rear drive wheel 106. Material transfer vehicle 100 also includes a left front drive wheel (not shown, but substantially similar to right front drive wheel 104) and a left rear drive wheel (not shown, but substantially similar to right rear drive wheel 106). Each of the drive wheels is driven by one or more conventional hydraulic motors (not shown) that are supplied with fluid under pressure by one or more conventional hydraulic pumps (also not shown). In the alternative, the frame of the vehicle may be supported on the roadway surface by ground-engaging drive assemblies comprising left and right side track-drive assemblies (not shown).

Material transfer vehicle 100 includes an asphalt paving material receiving device comprising a truck-receiving hopper 108. Truck-receiving hopper 108 is adapted to receive asphalt paving material from a delivery truck (not shown). In the alternative, vehicle 100 could be equipped with an asphalt paving material receiving device comprising a windrow pick-up head (not shown). An auger (not shown) is mounted in the truck-receiving hopper and is adapted to assist in conveying asphalt paving material from the truck-receiving hopper into loading conveyor 110, which in turn conveys the asphalt paving material off its output end 112 and into surge bin 114. The surge bin includes transverse auger 116 that is employed to mix the asphalt paving material in the surge bin in order to minimize segregation or separation of the aggregate portion of the asphalt paving material by size. Also located in the surge bin is surge conveyor 118, which is adapted to convey asphalt paving material upwardly out of the surge bin so that it may fall through chute 120 which is located over the input end of discharge conveyor 122. Discharge conveyor 122 is mounted for vertical pivotal movement about a substantially horizontal pivot axis at its input end that is perpendicular to the plane of the page of FIG. 3, as raised and lowered by linear actuator 124. Discharge conveyor 122 is also adapted for side-to-side movement about a substantially vertical axis by operation of one or more additional actuators (also not shown). Asphalt paving material that falls through chute 120 onto discharge conveyor 122 is discharged through chute 126 at conveyor output end 128 into an asphalt receiving hopper of an asphalt paving machine (not shown). Hydraulic drive systems including hydraulic pumps and hydraulic motors are provided to drive the various augers and conveyors. An engine (not shown but contained within engine compartment 130) provides the motive force for the hydraulic pumps that drive the hydraulic motors for the drive wheels, the augers and the various conveyors and other components of the vehicle.

Operator's station 132 is accessible by means of ladder 134, and includes right operator's platform 136 and a left operator's platform that is a mirror image of right operator's platform 136. Right operator's platform 136 includes right operator's seat 138, which is mounted for rotational movement about right rotational axis $A_{138}$ on right seat base 140 (best shown in FIGS. 5 and 6), first control panel 142 and second control panel 144. Left operator's platform also contains an operator's seat (not shown, but substantially identical to right operator's seat 138) that is mounted for rotational movement about a left rotational axis, a first control panel (not shown, but substantially identical to first control panel 142) and a second control panel (not shown, but substantially identical to second control panel 144). Both right operator's platform 136 and the left operator's platform are moveable between a travel position that is entirely within the outer periphery of material transfer vehicle 100 and an operating position that locates the operator's seat at least partially (and preferably substantially) outside the outer periphery of the vehicle. With reference to FIG. 2, it can be appreciated that material transfer vehicle 100 has a longitudinal centerline (not shown, but substantially the same as longitudinal centerline "C" of material transfer vehicle 50) and a width (also not shown, but substantially similar to width "W" of material transfer vehicle 50), which width is measured transverse to the longitudinal centerline. Thus, the width of material transfer vehicle 100 defines the extent of the "outer periphery". Furthermore, the outer periphery on one side of the vehicle is measured to be one-half of the width from the centerline. Consequently, movement of right operator's platform 136 to the operating position according to the invention locates right operator's seat 138 a distance that is greater than one-half of the width of the vehicle to the right from the centerline. More particularly, movement of right operator's platform 136 to the operating position locates right rotational axis $A_{138}$ a distance from the centerline that is greater than one-half of the width. Similarly, movement of the left operator's platform to the operating position according to the invention locates the left operator's seat a distance that is greater than one-half of the width of the vehicle to the left from the centerline, and more particularly, it locates the left rotational axis a distance from the centerline that is greater than one-half of the width.

Figure 7:
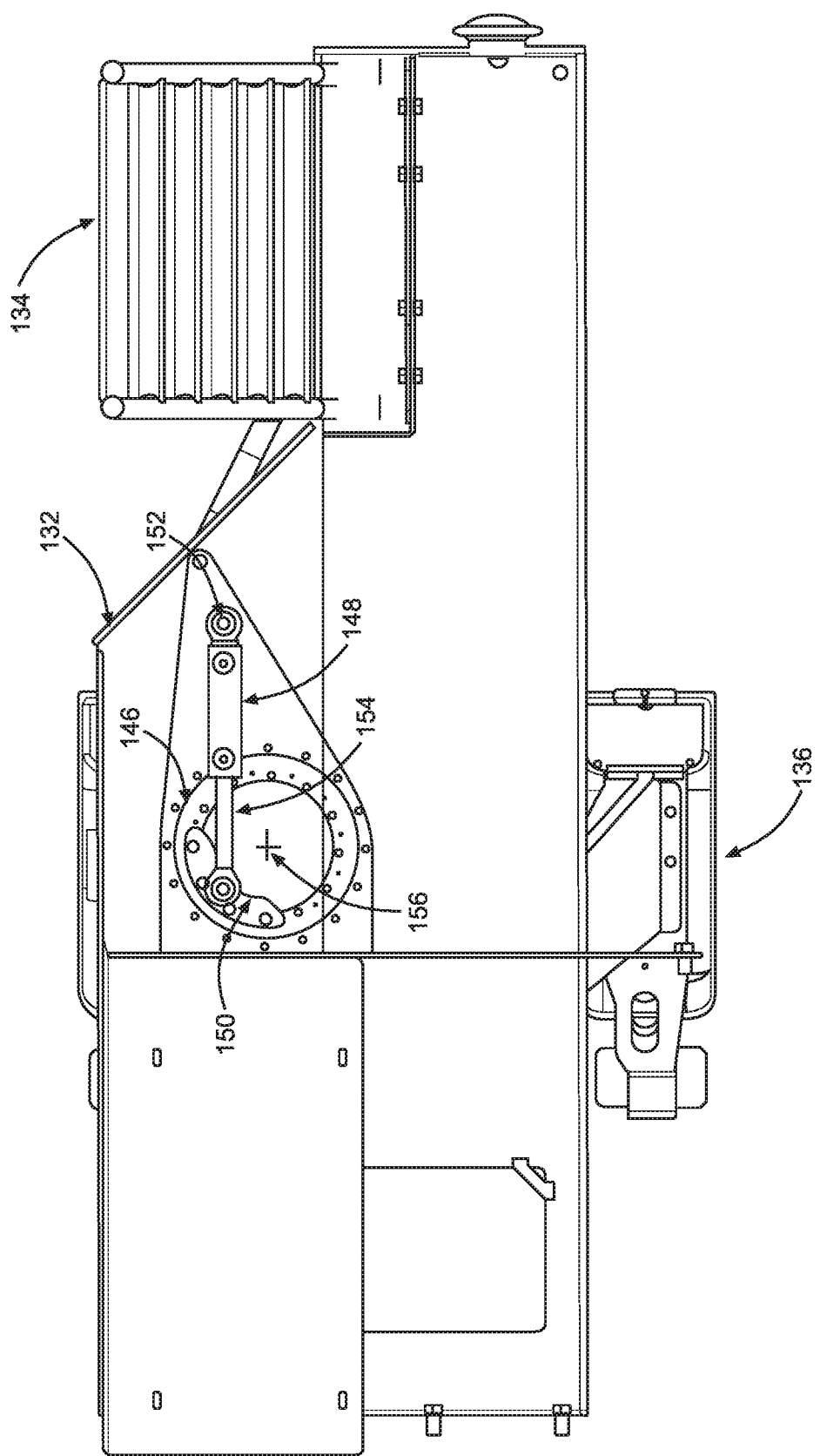
FIG. 7 is a bottom view of a portion of the material transfer vehicle shown in FIGS. 3-6, illustrating the preferred platform moving assembly in the travel position.
Figure 8:
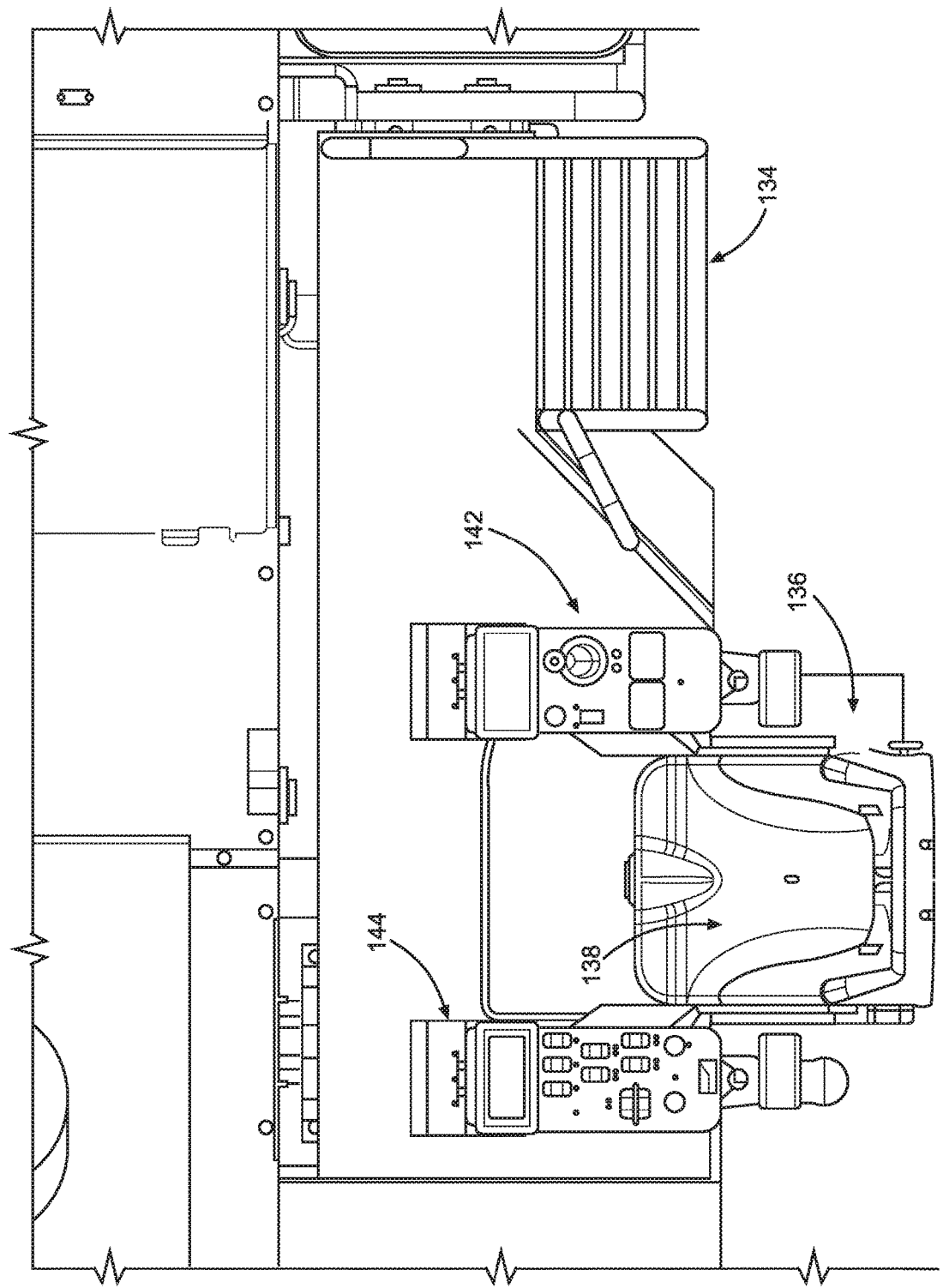
FIG. 8 is a top view of a portion of the material transfer vehicle shown in FIG. 3, illustrating the operator's platform in an operating position.
Figure 9:
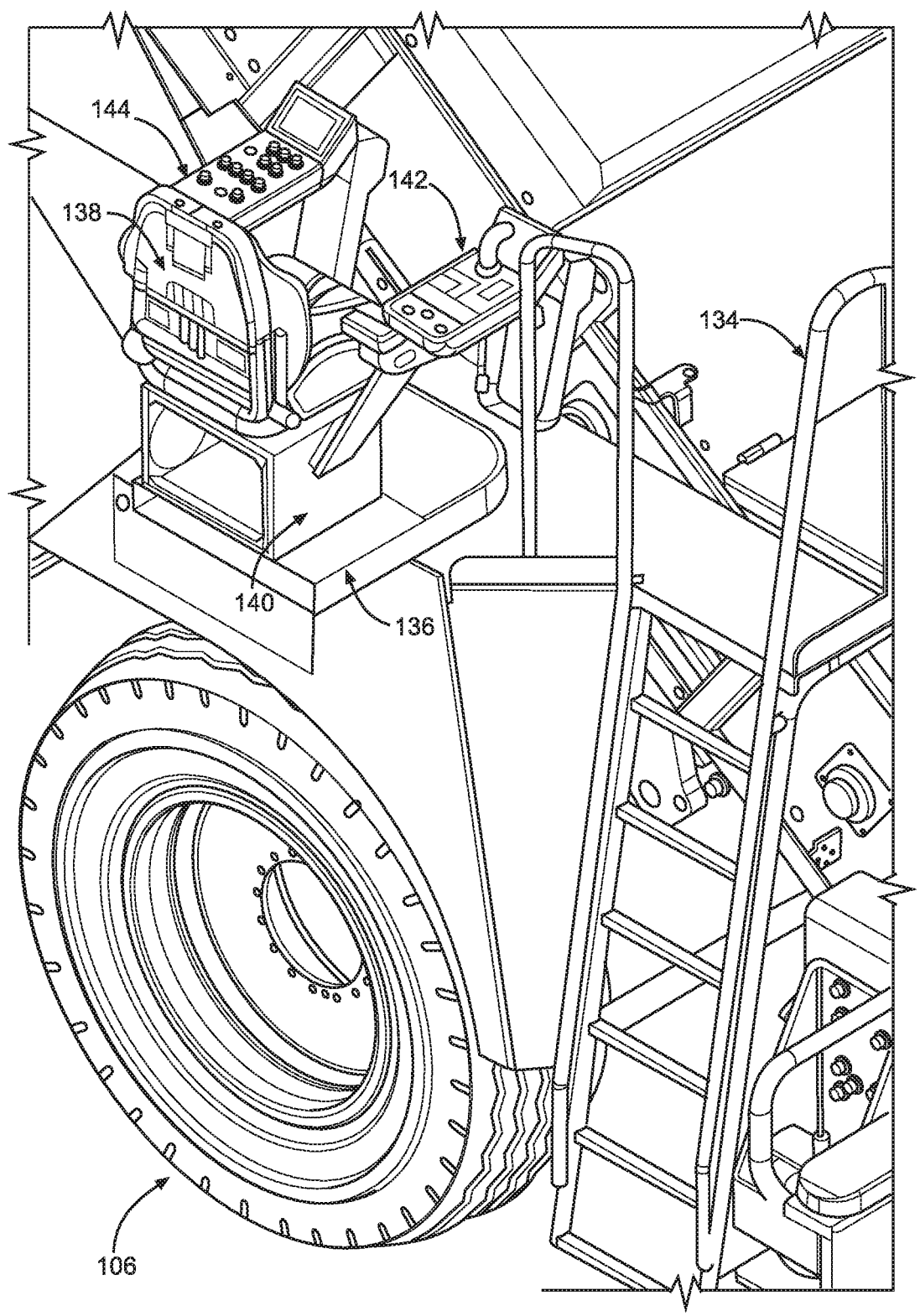
FIG. 9 is a perspective view of a portion of the material transfer vehicle shown in FIGS. 3 and 8, illustrating the operator's platform in the operating position.
Figure 10:
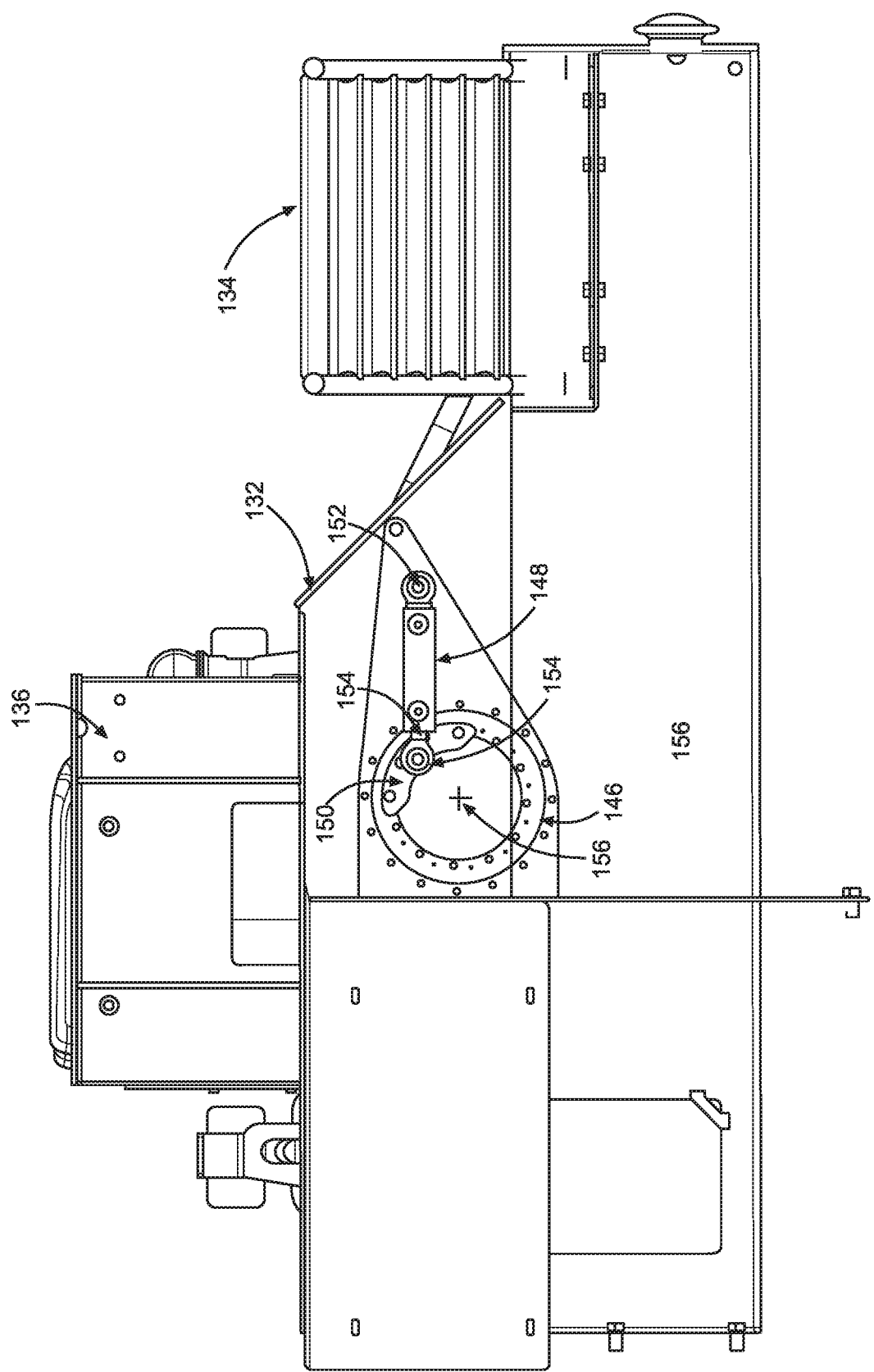
FIG. 10 is a bottom view of a portion of the material transfer vehicle shown in FIGS. 3, 8 and 9, illustrating the preferred platform moving assembly in the operating position.

FIGS. 4-10 provide a detailed view of right operator's platform 136. Right operator's platform 136 is mounted in operator's station 132 by means of a right platform moving assembly including slewing bearing 146. As shown in FIGS. 7 and 10, linear actuator 148 is attached between bracket 150 on the bottom of the slewing bearing and fixed point 152 on the bottom of operator's station 132. In the embodiment of the invention shown in the drawings, linear actuator 148 comprises a hydraulic or pneumatic cylinder having a rod 154 that may be moved between the extended position shown in FIG. 7, which locates right operator's platform 136 in the travel position that is entirely within the outer periphery of the material transfer vehicle 100, and the retracted position shown in FIG. 10, which locates right operator's platform 136 in the operating position that places right operator's seat 138 substantially outside the outer periphery of the material transfer vehicle. Extension and retraction of rod 154 moves bracket 150 to rotate slewing bearing 146 about substantially vertical axis 156 (that is perpendicular to the plane of the pages on which FIGS. 7 and 10 are shown).

The invention thus provides a material transfer vehicle, such as vehicle 100, which is provided with an operator's station comprising a right operator's platform 136 which is moveable between a travel position (shown in FIGS. 4 and 7) that is entirely within the outer periphery of the material transfer vehicle and an operating position (shown in FIGS. 8-10) that locates right operator's seat 138 substantially outside the periphery of the material transfer vehicle. In this embodiment of the invention, right operator's station platform 136 is mounted on a platform moving assembly comprising slewing bearing 146, which is moveable by the action of linear actuator 148. A similar arrangement is provided to move the left operator's platform between a travel position that is entirely within the outer periphery of the material transfer vehicle and an operating position that locates the left operator's seat substantially outside the periphery of the material transfer vehicle.

Although this description contains many specifics, these should not be construed as limiting the scope of the invention but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A material transfer vehicle comprising:
a frame;
a front end;
a rear end;
an asphalt paving material receiving device at the front end;
a discharge conveyor at the rear end, said discharge conveyor being adapted to convey asphalt paving material to a receiving hopper of an asphalt paving machine;
an operator's station comprising an operator's platform rotatably mounted to the frame and on top of which is mounted an operator's seat and at least one control panel, said operator's platform, including the operator's seat and the at least one control panel, being rotatable, as a unit, about a vertical axis that extends through the operator's platform between a travel position that is entirely within an outer periphery of the material transfer vehicle and an operating position that locates the operator's seat at least partially outside the outer periphery of the material transfer vehicle.

2. The material transfer vehicle of claim 1 wherein, in the operating position, the operator's platform is located outside the outer periphery of the material transfer vehicle.

3. The material transfer vehicle of claim 1:
which includes a longitudinal centerline and a width that is measured transverse to the longitudinal centerline;
the operator's seat is mounted on the operator's platform so as to be capable of rotation about a substantially vertical rotational axis;
movement of the operator's platform to the operating position locates the rotational axis a distance from the longitudinal centerline that is greater than one-half of the width.

4. The material transfer vehicle of claim 1 wherein the operator's platform is mounted in the operator's station by means of a platform moving assembly including a slewing bearing that is moveable via a linear actuator.

5. The material transfer vehicle of claim 4:
wherein the operator's station has a bottom with a fixed point thereon;
which includes a bracket on the bottom of the slewing bearing;
wherein the linear actuator is attached between the bracket on the bottom of the slewing bearing and the fixed point on the bottom of the operator's station, said linear actuator having a rod that may be moved between an extended position which locates the operator's platform in the travel position that is entirely within the outer periphery of the material transfer vehicle, and a retracted position which locates the operator's platform in the operating position that places the operator's seat at least partially outside the outer periphery of the material transfer vehicle.

6. The material transfer vehicle of claim 5 wherein extension and retraction of the rod of the linear actuator causes the bracket to rotate the slewing bearing about a vertical axis.

7. The material transfer vehicle of claim 1:
which material transfer vehicle includes:
a longitudinal centerline;
a width that is measured transverse to the longitudinal centerline;
wherein the operator's platform comprises right and left operator's platforms and the operator's seat comprises a right operator's seat that is mounted on top of the right operator's platform and a left operator's seat that is mounted on top of the left operator's platform,
wherein the right operator's platform is moveable between a right travel position that is entirely within the outer periphery of the material transfer vehicle and a right operating position that locates the right operator's seat a first distance that is greater than one-half of the width of the vehicle to the right from the longitudinal centerline, and
wherein the left operator's platform is moveable between a left travel position that is entirely within the outer periphery of the material transfer vehicle and a left operating position that locates the left operator's seat a second distance that is greater than one-half of the width of the vehicle to the left from the longitudinal centerline.

8. The material transfer vehicle of claim 7, wherein:
the right operator's seat is mounted on the right operator's platform so as to be capable of rotation about a vertical right rotational axis;
movement of the right operator's platform to the operating position locates the right rotational axis at the first distance;
the left operator's seat is mounted on the left operator's platform so as to be capable of rotation about a vertical left rotational axis;
movement of the left operator's platform to the operating position locates the left rotational axis at the second distance.

9. The material transfer vehicle of claim 1 further comprising:
a platform moving assembly rotatably mounting a bottom surface of the operator's platform to the frame; and
a seat base mounted between a top of the operator's platform and a bottom of the operator's seat,
wherein the operator's seat, seat base, at least one control panel, and operator's platform are configured to rotate, as said unit, on the platform moving assembly above the frame.

10. A material transfer vehicle comprising:
a frame;
a front end;
a rear end;
an asphalt paving material receiving device at the front end;
a discharge conveyor at the rear end, said discharge conveyor being adapted to convey asphalt paving material to a receiving hopper of an asphalt paving machine;
an operator's station comprising an operator's platform rotatably mounted to the frame and on top of which is mounted an operator's seat and at least one control panel, said operator's platform, including the operator's seat and the at least one control panel, being rotatable, as a unit, about a vertical axis that extends through the operator's platform between a travel position that is entirely within an outer periphery of the operator's station and an operating position that locates the operator's seat at least partially outside the outer periphery of the operator's station.

11. The material transfer vehicle of claim 10 wherein, in the operating position, the operator's platform is located outside the outer periphery of the operator's station.

12. The material transfer vehicle of claim 10 wherein the operator's platform is mounted in the operator's station by means of a platform moving assembly including a slewing bearing that is moveable via a linear actuator.

13. The material transfer vehicle of claim 12:
wherein the operator's station has a bottom with a fixed point thereon;
which includes a bracket on the bottom of the slewing bearing;
wherein the linear actuator is attached between the bracket on the bottom of the slewing bearing and the fixed point on the bottom of the operator's station, said linear actuator having a rod that may be moved between an extended position which causes the bracket to rotate the slewing bearing about a vertical axis to move the operator's platform to the travel position that is entirely within the outer periphery of the operator's station, and a retracted position which causes the bracket to rotate the slewing bearing about the vertical axis to move the operator's platform to the operating position that places the operator's seat at least partially outside the outer periphery of the operator's station.

14. The material transfer vehicle of claim 10:
which material transfer vehicle includes:
a longitudinal centerline;
a width that is measured transverse to the longitudinal centerline;
wherein the operator's platform comprises right and left operator's platforms and the operator's seat comprises a right operator's seat that is mounted on top of the right operator's platform and a left operator's seat that is mounted on top of the left operator's platform,
wherein the right operator's platform is moveable between a right travel position that is entirely within the outer periphery of the material transfer vehicle and a right operating position that locates the right operator's seat a first distance that is greater than one-half of the width of the vehicle to the right from the longitudinal centerline, and
wherein the left operator's platform is moveable between a left travel position that is entirely within the outer periphery of the material transfer vehicle and a left operating position that locates the left operator's seat a second distance that is greater than one-half of the width of the vehicle to the left from the longitudinal centerline.

15. The material transfer vehicle of claim 14, wherein:
the right operator's seat is mounted on the right operator's platform so as to be capable of rotation about a substantially vertical right rotational axis;
movement of the right operator's platform to the operating position locates the right rotational axis the first distance;
the left operator's seat is mounted on the left operator's platform so as to be capable of rotation about a substantially vertical left rotational axis;
movement of the left operator's platform to the operating position locates the left rotational axis the second distance.

16. The material transfer vehicle of claim 10 further comprising:
a platform moving assembly rotatably mounting a bottom surface of the operator's platform to the frame; and
a seat base mounted between a top of the operator's platform and a bottom of the operator's seat,
wherein the operator's seat, seat base, at least one control panel, and operator's platform are configured to rotate, as said unit, on the platform moving assembly above the frame.

17. A material transfer vehicle comprising:
a frame;
a front end;
a rear end;
an asphalt paving material receiving device at the front end;
a discharge conveyor at the rear end, said discharge conveyor being adapted to convey asphalt paving material to a receiving hopper of an asphalt paving machine;
an operator's station having a bottom with a fixed point, the operator's station further comprising:
an operator's platform;
an operator's seat mounted to the operator's platform;
a platform moving assembly mounting the operator's platform in the operator's station, the platform moving assembly including:
a slewing bearing;
a bracket disposed at the bottom of the slewing bearing;
a linear actuator attached between the bracket at the bottom of the slewing bearing and the fixed point of the operator's station;
wherein, via the platform moving assembly, the operator's platform is moveable between a travel position that is entirely within an outer periphery of the material transfer vehicle and an operating position that locates the operator's seat at least partially outside the outer periphery of the material transfer vehicle.

* * * * *